United States Patent [19]

Buettner et al.

[11] Patent Number: 4,761,872
[45] Date of Patent: Aug. 9, 1988

[54] METHOD OF MAKING A PILLOW

[76] Inventors: E. Jane Buettner; Donald D. Buettner, both of 2619 Willow, Woodbury County, Sioux City, Iowa 51106

[21] Appl. No.: 4,881

[22] Filed: Jan. 20, 1987

Related U.S. Application Data

[60] Division of Ser. No. 819,993, Jan. 15, 1986, abandoned, which is a continuation of Ser. No. 718,816, Apr. 1, 1985, abandoned, which is a continuation of Ser. No. 421,682, Sep. 22, 1982, abandoned.

[51] Int. Cl.⁴ ............................................. B23P 11/02
[52] U.S. Cl. ........................................ 29/451; 29/235; 5/434; 53/255
[58] Field of Search .................... 29/451, 235; 53/255; 5/434–437, 481, 490

[56] References Cited

U.S. PATENT DOCUMENTS

| Re. 16,283 | 3/1926 | Mitchell | 29/451 U X |
| 743,505 | 11/1903 | Heffner | 53/255 |
| 1,669,721 | 5/1928 | McCullough | 29/451 U X |
| 3,234,569 | 2/1966 | Stewart | 5/438 |
| 3,992,733 | 11/1976 | Racine | 5/437 |
| 4,308,654 | 1/1982 | Bogart | 29/451 |
| 4,581,804 | 4/1986 | McLaughlin | 29/451 |

Primary Examiner—Charlie T. Moon
Attorney, Agent, or Firm—E. Robert Newman

[57] ABSTRACT

A pillow (10) has a filler comprised of a foam rubber core (16) around which is spirally wrapped a polyester fiber batting (28). Circular end walls (13) are formed by drawing together extensions of a tubular casing (12) after the filler has been thereinto inserted in a pre-compressed condition. A method of making the pillow comprises snugly fitting an end of the extended casing (12) over the small end of a tapered tube (33), placing the rolled core (16) and batting (28) into a plastic bag (34), pushing the bag (34) and filler through the large end of the tapered tube (33) into the extended casing, removing the casing (12) from the tapered tube (33), removing the bag from the free end of the casing (12), and then forming the casing end walls (13) by pulling and tying drawstrings (27).

6 Claims, 1 Drawing Sheet

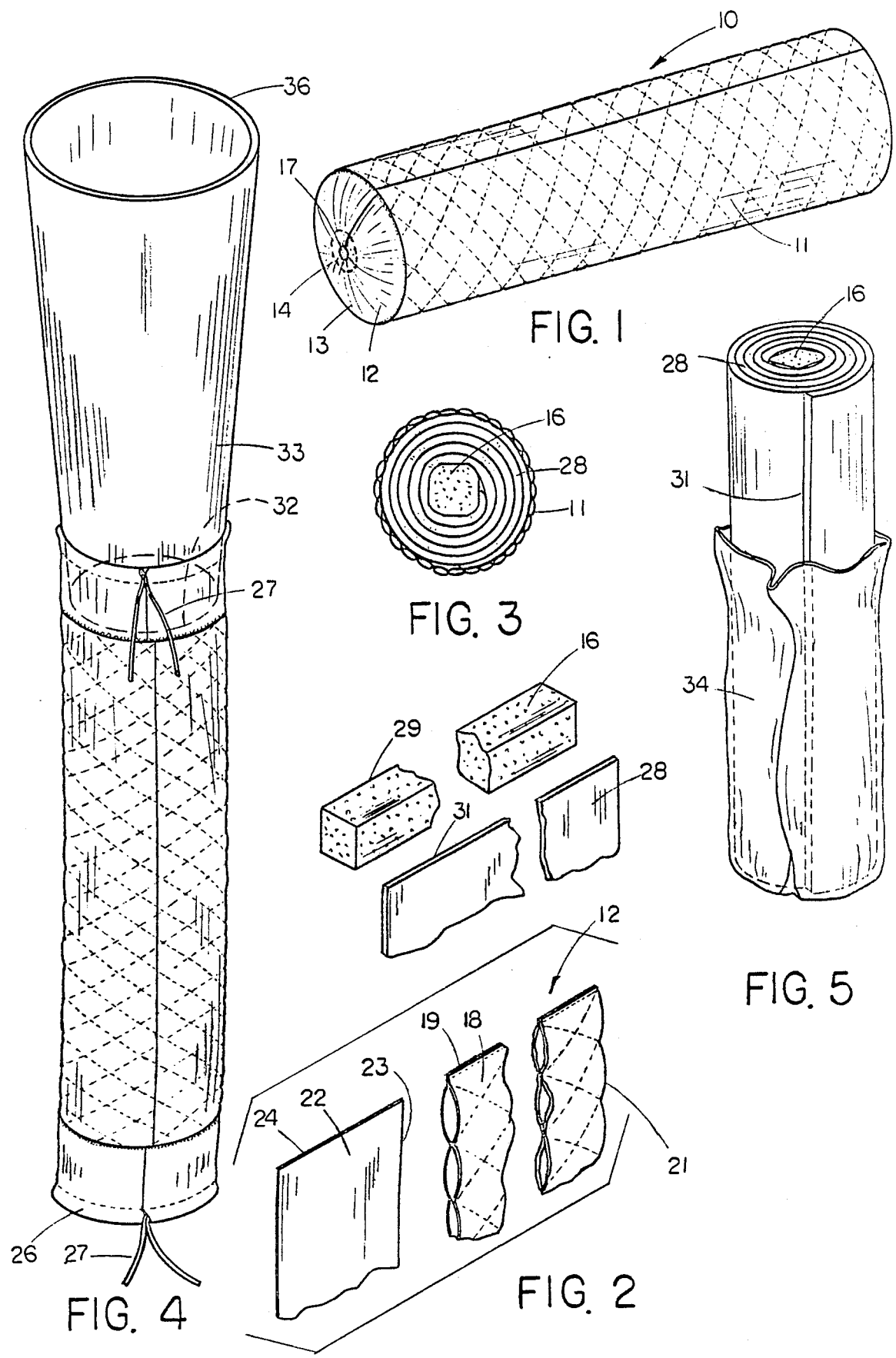

METHOD OF MAKING A PILLOW

This application is a division of application Ser. No. 819,993, filed on 1-15-86, now abandoned, which is a continuation of application Ser. No. 718,816, filed 4-1-85, now abandoned, which is a continuation of application Ser. No. 421,682, filed 9-22-82, now abandoned.

TECHNICAL FIELD

The present invention relates generally to pillows and more particularly to those having a uniform conformity lengthwise, such as circular, and being especially suitable for therapeutic uses. The invention also relates to methods of making such pillows when they comprise filler materials positioned within the casing in a predetermined fashion.

BACKGROUND ART

Although the present invention has universal application where comfort, durability, and ease of maintenance are desirable end goals, it is especially suitable in therapeutic settings. Those suffering from the trauma of a surgical operation, such as an operation to the cervical area of the spine, from an accident or from various disorders of the nervous system or bone structure have a particular need for a pillow providing these attributes. This need arises not only from soreness and the need for rest incident to healing, but also for a pillow which discourages all unnecessary movements by the convalescent.

Various types of pillows presently available which attempt to satisfy these needs include those in the following categories: foam rubber cylinders, foam rubber sections flat on the bottom and having one or more humps on the top, as for elevation of the neck, and cloth casings filled with various batting materials either folded or rolled into a tube. In the case of the solid foam rubber types, they tend to spring upwardly where the body part is not placed, thus uncomfortably moving sore parts and trapping body heat. In addition, their excess springiness tends to move them out of the selected position, particular on a hospital bed having its head portion elevated. Furthermore, a solid block of foam rubber is an expensive material, especially when it must be cut or formed in shapes having unusual cross-sections. Pillows entirely filled with batting, either cotton or polyester fiber, do not readily retain a desirable shape, tend to mat and flatten out where weight has been applied, and lack sufficient firmness for maximum comfort.

DISCLOSURE OF INVENTION

An object of the present invention is the provision of an improved pillow.

Another object is to provide a pillow which does not tend to spring up excessively where it is not being rested upon and thereby interfere with the user's comfort.

A further object of the invention is the provision of a pillow which is less subject to deformation after continued use.

Still another object is to provide a pillow which is not apt to become matted after continued use.

A still further object of the invention is the provision of an improved method of making a pillow.

Yet another obejct is to provide a method of making a pillow which retains the shape and positional relationship of the filler material.

Yet a further object of the invention is the provision of a method of making a pillow which results in the tighter packing of filler material within it.

An additional object is to provide a method of making a pillow with a minimal amount of labor and, yet, without requiring expensive materials, equipment and/or amount of fabrication labor.

In a more general sense, it is an object of this invention to provide a cylindrical pillow having a filler comprised of a foam rubber core which is wrapped spirally with a thin rectangle of polyester fiber. The tubular portion of the casing is made of quilting having a thin polyester fiber filling and a nylon tricot backing. The two end walls are each comprised of a single strip of cloth, first sewn into short tubular portions, then sewn to the open ends of the tubular portion of the casing, then brought back by folding in half and top-stitched to form an extended tube, and then stitched a short distance from the outer edge to form a channel for the insertion of a drawstring.

The pillow is made by first wrapping the polyester fiber in a spiral around the foam rubber core and then inserting both into a plastic bag which may have a lesser height than the length of the combined filler and a larger cross-section than the cross-section of the combined filler. One of the end wall extensions of the empty casing is then fitted snugly over the smaller end of a tapered hollow tube into which the filler and plastic bag are inserted, bag bottom first. The bag and filler are then pushed through the tapered tube until the filler is somewhat in its final position within the cloth casing, after which the casing is slipped off the tapered tube and the plastic bag is removed from the free end of the tubing.

It is then a simple job to pull tight and tie the drawstring located on each end of the casing extensions until end walls are formed. The drawstring ends may then be inserted through the circular opening left by the gathered material of the end wall and pushed out of the way between the end wall and the filler material. The plastic bag and tapered tube are then available for making additional pillows.

These and other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of the completed pillow disclosed herein;

FIG. 2 is a perspective view of portions of the pillow material before making the pillow, including, from top to bottom, the core, a partial view of the batting and a partial view of the casing;

FIG. 3 is a cross-sectional view of the completed pillow taken along line 3—3 of FIG. 1;

FIG. 4 is a perspective view of the tapered open-ended tube having an empty casing fitted thereon prior to the insertion of the filler; and FIG. 5 is a perspective view of the combined filler of the pillow placed within a plastic bag prior to its insertion into the casing.

BEST MODE FOR CARRYING OUT THE INVENTION

Referring now to the drawings wherein like reference numerals designate identical or corresponding parts throughout the various views, and more particularly to FIG. 1, whereon the pillow is designated generally at 10, the preferred mode of the completed pillow (10) is seen to be in the shape of a cylinder having a circular cross-section. Also visible in FIG. 1 are the tubular portion (11) of casing (12), one of two identical end walls (13) and a portion of one end (14) of foam rubber core (16) (see also FIGS. 2 and 3) which may be seen through a circular opening (17) at the center of end wall (13).

Referring now to FIG. 2, where the casing is designated generally at (12), the tubular portion (11) thereof, prior to fabrication, is a rectangular piece of cloth-like material (18) having one side (19) substantially equal in length to the desired length of the pillow and the other side (21) substantially equal in length to the desired circumference of the pillow. A preferred material for tubular portion (11) is a quilting comprising a cotton polyester facing, a thin layer of polyester fiber filling and a nylon tricot backing. The use of such a quilting, which is generally commercially available, enhances appearance, shape maintenance and fabrication, as will be hereinafter explained.

Each end wall (13) prior to fabrication is a rectangular strip of cloth-like material (22) (one only shown in FIG. 2), having one side (23) substantially equal in length to the circumferential side of tubular portion (11) and the other side (24) slightly longer than the diameter of pillow (10).

Each of the cloth-like material (18) and the two end wall cloth-like strips of material (22) are then individually sewn into tubes (shown after inversion, only at a later stage of fabrication in FIGS. 1 and 4). Said inside out strips (22) are then pulled over either end of said inside out tubular portion (11) until the outer circumferential edges (21 and 23) line up and the same are then stitched together to form casing (12) in the stage of an extended inside out tube.

Casing (12) at this stage is now turned outside in and each strip (22) is doubled back to the outside and zig-zag stitched to the formerly exposed ends of tubular portion (11), the tube seams of portion (11) and each end wall strip (22) being originally oriented so as to be hidden with respect to the exposed sides of casing (12). Referring now to FIG. 4, each strip (22) is peripherally stitched near its doubled back portion to form channel (26). Channel (26) is then snipped open near the tube seam after which drawstring (27) is pulled therethrough in a conventional manner. Casing (12) is now in the form of an extended hollow tube for the receipt of the filler materials.

Still referring to FIG. 2, the two materials which comprise the filler for pillow (10) are a core (16) and a batting mass (28), both indicated thereon in their shape and form prior to the construction of the pillow. Core (16) is of rubber-like material, preferably synthetic foam rubber, and is in the shape of an elongated bar having a square cross-section. The square cross-section is elected for reasons of economy, a circular or other cross-section being also suitable. Other shapes may be more desirable if my invention is to be used for pillows having non-circular cross-sections, such as oval. Batting mass (28) is in shape a thin rectangle, and is preferably comprised of one of many polyester fiber battings commercially available. Length (29) of core (16) and dimension (31) of batting (28) are both substantially equal to the desired final length of completed pillow (10).

Referring now to FIG. 3, both core (16) and batting (28) can be seen in their final conformation after pillow (10) has been completed, core (16) having a modified circular cross-section and batting (28) being spirally wrapped thereabout. It should be appreciated that the most desired completed pillow (10) will comprise a core (16) and a quantity of batting (28), after being wrapped thereabout, which will actually be somewhat greater in diameter than that of casing (12) prior to its insertion thereinto. Although it is theoretically possible to force such a filler into a smaller casing due to the compressibility and resiliency of both foam rubber and polyester batting, the strictly manual accomplishment of same without disturbing the perfect spiral wrapping of batting (28) about core (16) is very difficult, if not impossible. The use of cotton batting might make the task easier since cotton, being less resilient, would not be as apt to spring off of core (16) after being spirally wrapped thereabout. However, as explained hereinabove, for many reasons cotton is a less desirable material. The resiliency of polyester fiber, which makes it more difficult to stuff into a smaller casing of cloth-like material, will materially improve the comfort characteristics of the completed pillow. This is especially true if the combined filler of polyester fiber and foam rubber remains in a pre-compressed condition following its stuffing into the casing.

Our novel method of making pillow (10) which overcomes these difficulties and produces a springier, softer pillow will now be explained. After casing (12) is in the form of an extended hollow tube as explained hereinabove, a short portion thereof is slipped over the smaller end (32) of a hollow tapered tube (33) as seen in FIG. 4. Although the smaller end (32) of tube (33) is sized to receive the open end of casing (12) snugly, it is sometimes advisable to apply a small coat of wax, such as an aerosol spray furniture polish, to the appropriate area of tapered tube (33), in order to speed this operation. Tapered hollow tube (33) is thin-walled and may be of metal, plastic or other suitable material having a non-snag finish.

After batting (28) is spirally wrapped about core (16) they are both inserted all the way into a plastic bag (34) as seen in FIG. 5. Plastic bag (34) may be somewhat shorter than the length of core (16) and may have a somewhat larger diameter than the outer edge of batting (28) after it is wrapped about core (16). A common plastic kitchen bag or wastepaper basket liner will serve as plastic bag (34).

Plastic bag (34), together with spirally wrapped core (16) and batting (28), is then inserted through the larger end (36) of tapered tube (33), entirely through tapered tube (33) and on into casing (12) until core (16) and batting (28) are positioned approximately in alignment with tubular portion (11) of casing (12). As a result of the movement of the filler through tapered tube (33), it is compressed to a diameter compatible with that of portion (11) of casing (12). Also as a result of the relative frictionless surfaces of bag (29), the inside of tapered tube (33) and the nylon tricot backing of tubular portion (11), it is possible to continue moving the combined filler material into its final position with minimal disturbance of the conformation of its elements.

Next, casing (12) is removed from tapered tube (33) and plastic bag (34) is slipped out of casing (12) through the open end thereof which is distal tapered tube (33) during the previous operations. Tapered tube (33) and plastic bag (34) thus do not comprise a part of completed pillow (10) but are, in actuality, reusable machine parts employed in my novel method of making pillow (10).

To complete the fabrication of pillow (10) it is only necessary to draw and tie drawstrings (27) until strips (22) form end walls (13), after which the loose ends of drawstrings (27) beyond the knot are pushed through openings (17) out of sight between end walls (13) and each end of the filler materials. The diameter of polyester fiber batting in combination with foam rubber core material which can be thus compressibly inserted within a casing is such that it is necessary to warn users of the pillow on the printed label against removal of the filler for cleaning or other purposes, because they will not be able to reinsert it by ordinary means. However, all of the materials of pillow (10) as suggested hereinabove, form a completed product which is machine washable.

Accordingly, it is believed that all of the objects mentioned above are accomplished by use of the best mode for carrying out the invention disclosed herein. Obviously, many modifications and variations of the present invention are possible in light of the above teachings. It is therefore to be understood that, within the scope of the appended claims, the invention may be practised otherwise than as specifically described.

We claim:

1. A method of making a pillow comprising the steps of:

placing filler material comprised of a rectangular piece of batting comprised of polyester fiber which is spirally wound into a somewhat cylindrical shape into a plastic bag having a closed bottom;

snugly fitting a short portion of one end of a tubular casing which has a diameter slightly less than that of the cylindrical shape of the spirally wound filler material over the smaller end of a tapered tube, said smaller end having a diameter approximately equal to that of the casing;

stuffing the bag and filler through the larger end of the tapered tube, bag bottom first, until the filler is positioned within the casing;

removing the bag from the casing through the other end thereof; and removing the casing from the tapered tube, whereby the filling will be pre-compressed within the casing.

2. The method of making a pillow as recited in claim 1, wherein said rectangular piece of batting is spirally wound about a core of rubber-like material which extends substantially the length of said cylindrical shape.

3. A method of making a pillow as recited in claim 1, wherein the tubular portion of the casing is comprised of a quilting having a nylon tricot backing.

4. The method of making a pillow as recited in claim 3, wherein said rectangular piece of batting is spirally wound about a core of rubber-like material which extends substantially the length of said cylindrical shape.

5. A method of making a pillow as recited in claim 1, wherein the casing is circular in cross-section and extends beyond the filler at either end by a length slightly less than the radius of the casing and is further comprised of:

means attached at either end for holding a drawstring; and a drawstring and further comprises the steps of:

pulling the drawstring tight whereby end walls are formed;

tying the ends of each drawstring together; and stuffing the free ends of each drawstring through the circular space remaining within the gathered end wall material and then between the end wall material and the filler.

6. The method of making a pillow as recited in claim 3, wherein said rectangular piece of batting is spirally wound about a core of rubber-like material which extends substantially the length of said cylindrical shape.

* * * * *